(12) United States Patent
Rabasco et al.

(10) Patent No.: US 10,703,841 B2
(45) Date of Patent: *Jul. 7, 2020

(54) TINT BASE PAINT FORMULATION WITH A POLY(OXYALKYLENE-URETHANE) ASSOCIATIVE THICKENER MODIFIED WITH A HYDROPHOBIC OLIGOMER

(71) Applicants: Rohm and Haas Company, Collegeville, PA (US); Dow Global Technologies LLC, Midland, MI (US)

(72) Inventors: John J. Rabasco, Allentown, PA (US); Duane R. Romer, Midland, MI (US); Daniel A. Saucy, Harleysville, PA (US); Antony K. Van Dyk, Blue Bell, PA (US)

(73) Assignees: Rohm and Haas Company, Collegeville, PA (US); Dow Global Technologies LLC, Midland, MI (US)

( * ) Notice: Subject to any disclaimer, the term of this patent is extended or adjusted under 35 U.S.C. 154(b) by 139 days.

This patent is subject to a terminal disclaimer.

(21) Appl. No.: 16/179,231

(22) Filed: Nov. 2, 2018

(65) Prior Publication Data

US 2019/0135964 A1 May 9, 2019

Related U.S. Application Data

(60) Provisional application No. 62/581,353, filed on Nov. 3, 2017.

(51) Int. Cl.
| | |
|---|---|
| *C08F 220/18* | (2006.01) |
| *C09D 133/00* | (2006.01) |
| *C08G 18/48* | (2006.01) |
| *C08G 18/77* | (2006.01) |
| *C08G 18/76* | (2006.01) |
| *C08G 18/73* | (2006.01) |
| *C08F 212/08* | (2006.01) |
| *C08L 33/08* | (2006.01) |
| *C08L 33/10* | (2006.01) |
| *C08L 75/04* | (2006.01) |
| *C08G 18/75* | (2006.01) |
| *C08G 18/62* | (2006.01) |
| *C08G 18/24* | (2006.01) |
| *C09D 7/43* | (2018.01) |

(52) U.S. Cl.
CPC .......... *C08F 220/18* (2013.01); *C08F 212/08* (2013.01); *C08G 18/246* (2013.01); *C08G 18/4833* (2013.01); *C08G 18/4837* (2013.01); *C08G 18/6245* (2013.01); *C08G 18/73* (2013.01); *C08G 18/751* (2013.01); *C08G 18/755* (2013.01); *C08G 18/758* (2013.01); *C08G 18/7621* (2013.01); *C08G 18/7642* (2013.01); *C08G 18/7671* (2013.01); *C08G 18/7678* (2013.01); *C08G 18/773* (2013.01); *C08L 33/08* (2013.01); *C08L 33/10* (2013.01); *C08L 75/04* (2013.01); *C09D 133/00* (2013.01); *C08L 2201/54* (2013.01); *C09D 7/43* (2018.01)

(58) Field of Classification Search
CPC .... C08F 220/18; C08F 212/08; C09D 133/00; C09D 7/43; C08L 33/08; C08L 33/10; C08L 75/04; C08L 2201/54; C08G 18/773; C08G 18/4833; C08G 18/755; C08G 18/7642; C08G 18/7678; C08G 18/7621; C08G 18/7671; C08G 18/4837; C08G 18/6245; C08G 18/751; C08G 18/246; C08G 18/758; C08G 18/73
USPC ........................................................ 524/556
See application file for complete search history.

(56) References Cited

U.S. PATENT DOCUMENTS

| | | | | |
|---|---|---|---|---|
| 6,069,217 A | * | 5/2000 | Nae .................... | C08G 18/2825 524/555 |
| 2012/0130000 A1 | * | 5/2012 | Rabasco ................ | C08G 18/66 524/500 |
| 2014/0121305 A1 | * | 5/2014 | Brown .................. | C09C 1/3676 524/35 |

FOREIGN PATENT DOCUMENTS

| | | | | |
|---|---|---|---|---|
| CN | 102174163 A | * | 9/2011 | |
| EP | 2455412 A1 | * | 5/2012 | ............. C08G 18/66 |
| EP | 2455412 A1 | | 5/2012 | |
| EP | 3290452 A1 | | 3/2018 | |
| WO | 2013002999 A1 | | 1/2013 | |
| WO | WO-2013002999 A1 | * | 1/2013 | ............... C09D 7/68 |

* cited by examiner

*Primary Examiner* — Michael Bernshteyn
(74) *Attorney, Agent, or Firm* — Reid S. Willis

(57) ABSTRACT

The present invention relates to a composition comprising an aqueous dispersion of acrylic based polymer particles; less than 15 PVC of a pigment; and a hydrophobically modified poly(oxyalkylene-urethane) rheology modifier having a hydrophobic portion represented by Structure I:

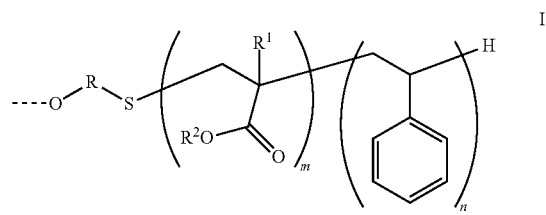

Where R, $R^1$, $R^2$, m an n are defined herein. The composition provides viscosity stability for paint formulations containing a HEUR rheology modifier.

9 Claims, No Drawings

TINT BASE PAINT FORMULATION WITH A POLY(OXYALKYLENE-URETHANE) ASSOCIATIVE THICKENER MODIFIED WITH A HYDROPHOBIC OLIGOMER

The present invention relates to a tint base paint formulation containing a poly(oxyalkylene-urethane) based associate thickener modified with a hydrophobic oligomer. The formulation is useful in paints containing colorant.

Hydrophobically modified, poly(oxyalkylene-urethane) based associative thickeners, more particularly hydrophobically modified, polyethylene oxide urethane based associative thickeners (HEURs) are often preferred as thickening agents for paints because of the good flow they provide to the paint, coupled with acceptable sag resistance. However, a long-standing weakness of standard HEURs is that the viscosity of a HEUR-thickened paint typically decreases significantly when colorant is added. This undesirable effect is particularly troublesome for medium and deeply tinted paints. The loss of viscosity makes the paint too thin, resulting in an unacceptably low sag resistance, which leads to runs and drips on the wall and a poor roller stipple pattern.

It would therefore be an advance in the art of coating compositions to develop a HEUR-containing tint base paint formulation that does not experience a significant drop in viscosity upon addition of a colorant.

SUMMARY OF THE INVENTION

The present invention addresses a need in the art by providing a composition comprising an aqueous dispersion of a) 10 to 60 weight percent, based on the weight of the composition, of polymer particles; b) less than 15 PVC of pigment particles; and c) from 0.05 to 2 weight percent, based on the weight of the composition, of a hydrophobically modified poly(oxyalkylene-urethane) rheology modifier having a hydrophobic portion represented by Structure I:

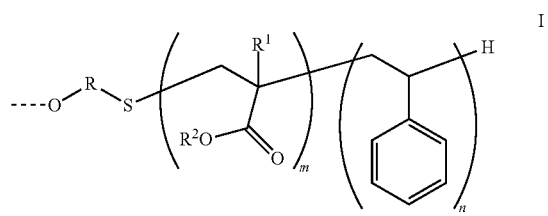

where R is a $C_2$-$C_{20}$ divalent hydrocarbyl group; each $R^1$ is independently H or methyl; each $R^2$ is independently H, $C_1$-$C_{18}$-alkyl, $C_5$-$C_8$-cycloalkyl, aryl, $C_1$-$C_{18}$-alkylaryl, $C_1$-$C_3$-dialkylamino-$C_1$-$C_{18}$-alkyl, $C_1$-$C_{30}$-alkoxy-$(CH_2CH_2O)_z$—$CH_2CH_2$—, aryloxy-$(CH_2CH_2O)_z$ $CH_2CH_2$— or glycidyl; m is 2 to 20; n is 0 to 20; m+n is 2 to 20; and z is from 0 to 50.

The paint composition of the present invention addresses a need in the art by providing viscosity stability upon tinting for paints containing a HEUR rheology modifier.

DETAILED DESCRIPTION OF THE INVENTION

The present invention is a composition comprising an aqueous dispersion of a) 10 to 60 weight percent, based on the weight of the composition, of polymer particles; b) less than 15 PVC of pigment particles; and c) from 0.05 to 2 weight percent, based on the weight of the composition, of a hydrophobically modified poly(oxyalkylene-urethane) rheology modifier having a hydrophobic portion represented by Structure I:

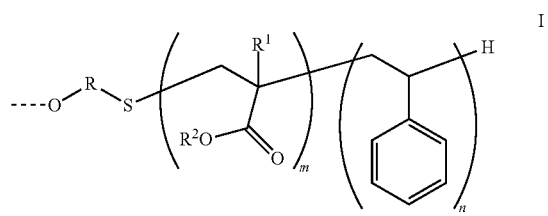

where R is a $C_2$-$C_{20}$ divalent hydrocarbyl group; each $R^1$ is independently H or methyl; each $R^2$ is independently H, $C_1$-$C_{18}$-alkyl, $C_5$-$C_8$-cycloalkyl, aryl, $C_1$-$C_{18}$-alkylaryl, $C_1$-$C_3$-dialkylamino-$C_1$-$C_{18}$-alkyl, $C_1$-$C_{30}$-alkoxy-$(CH_2CH_2O)_z$—$CH_2CH_2$—, aryloxy-$(CH_2CH_2O)_z$ $CH_2CH_2$— or glycidyl; m is 2 to 20; n is 0 to 20; m+n is 2 to 20; and z is from 0 to 50.

R is preferably a $C_2$-$C_{10}$ branched or linear alkylene group such as —$CH_2CH_2$—, —$CH_2CH_2CH_2$— or —$CH_2CH_2CH_2CH_2$—; each $R^2$ is preferably a $C_1$-$C_{18}$ alkyl group such as a methyl, ethyl, propyl, n-butyl, 2-ethylhexyl, or 2-propylheptyl group; and m is preferably 3 to 10. Preferably n is 0 to 10; preferably n is 0 to 5; m+n is preferably 3 to 10, more preferably 3 to 8.

The aqueous dispersion of polymer particles (that is, the latex) is preferably a dispersion of polymer particles comprising structural units of an acrylate or a methacrylate monomer or a vinyl ester monomer or combinations thereof.

The term "structural unit" of the named monomer refers to the remnant of the monomer after polymerization. For example, a structural unit of methyl methacrylate is as illustrated:

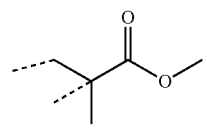

where the dotted lines represent the points of attachment of the structural unit to the polymer backbone.

Preferably, the polymer particles comprise at least 30, more preferably at least 50 weight percent structural units of acrylate and methacrylate monomers or preferably comprise at least 30, more preferably at least 50 weight percent structural units of a vinyl ester monomer. Examples of suitable acrylate and methacrylate monomers include methyl methacrylate, ethyl methacrylate, butyl methacrylate, ureido methacrylate, ethyl acrylate, butyl acrylate, 2-ethylhexyl acrylate, and 2-propylheptyl acrylate. Preferred combinations of acrylate and methacrylate monomers include methyl methacrylate and one or more monomers selected from the group consisting of ethyl acrylate, butyl acrylate, ureido methacrylate, 2-propylheptyl acrylate, and 2-ethylhexyl acrylate. More preferred combinations of acrylic monomers include methyl methacrylate and butyl acrylate; methyl methacrylate and 2-ethylhexyl acrylate; and methyl methacrylate, butyl acrylate, and ethyl acrylate, with the combination of methyl methacrylate and butyl acrylate being most preferred. Examples of vinyl ester-based monomers include vinyl acetate and vinyl versatates. An example of a vinyl ester-based copolymer is vinyl acetate-ethylene (VAE).

The polymer particles may also include structural units of other monomers such as styrene, acetoacetoxyethyl methacrylate, acrylonitrile, acrylamide, and 2-acrylamido-2-methylpropane sulfonic acid. Additionally, the polymer particles preferably comprises from 0.2, more preferably from 0.5, and most preferably from 1 weight percent, to preferably 5, and more preferably to 3 weight percent structural units of an ethylenically unsaturated carboxylic acid monomer such as acrylic acid, methacrylic acid, or itaconic acid.

The composition of the present invention may be contacted with a colorant at a sufficient concentration to impart the desired color. As used herein, "colorant" refers to a liquid dispersion of a colored pigment. The concentration of colorant is generally present in the range of from 5 to 20 volume percent of the total volume of the paint and colorant. Examples of colored pigments include phthalocyanine blue, phthalocyanine green, monoarylide yellow, diarylide yellow, benzimidazolone yellow, heterocyclic yellow, DAN orange, quinacridone magenta, quinacridone violet, organic reds, including metallized azo reds and nonmetallized azo reds, carbon black, lampblack, black iron oxide, yellow iron oxide, brown iron oxide, and red iron oxide.

The composition comprises less than 15 PVC of pigment particles; as used herein, pigment particles refer to $TiO_2$ or $BaSO_4$ particles. The composition preferably comprises less than 10, and more preferably less than 8 pigment volume concentration (PVC) of $TiO_2$ and $BaSO_4$. For deep base formulations, the PVC of pigment particles is preferably <1. PVC is defined by the following formula:

$$PVC = \left[\frac{Vol(\text{Pigment} + \text{Extender})}{Vol(\text{Pigment} + \text{Extender} + \text{Binder Solids})}\right] \times 100$$

where binder solids refers to the contribution of polymer from the aqueous dispersion of the polymer particles that bind the pigment and extender particles together.

The hydrophobically modified alkylene oxide urethane polymer is a polyethylene, polypropylene, or polybutylene oxide urethane polymer, preferably a polyethylene oxide urethane polymer (a HEUR) modified with the hydrophobe of Structure I. The polymer may be prepared by contacting together under reactive conditions a) a diisocyanate; b) a water-soluble polyalkylene glycol; and c) a capping agent which is a compound of Structure Ia:

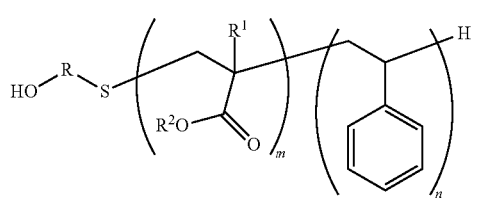

Ia

Examples of suitable diisocyanates include 1,4-tetramethylene diisocyanate, 1,6-hexamethylene diisocyanate (HDI), 2,2,4-trimethyl-1,6-diisocyanatohexane, 1,10-decamethylene diisocyanate, 4,4'-methylenebis(isocyanatocyclohexane) ($H_{12}$-MDI), 2,4'-methylenebis(isocyanatocyclohexane), 1,4-cyclohexylene diisocyanate, 1-isocyanato-3-isocyanatomethyl-3,5,5-trimethylcyclohexane (IPDI), m- and p-phenylene diisocyanate, 2,6- and 2,4-toluene diisocyanate (TDI), xylene diisocyanate, 4-chloro-1,3-phenylene diisocyanate, 4,4'-methylene diphenyl diisocyanate (MDI), 1,5-naphthylene diisocyanate, and 1,5-tetrahydronaphthylene diisocyanate. Examples of commercially available diisocyanates are Desmodur W cycloaliphatic diisocyanate (DesW) and Desmodur H (HDI).

A water-soluble polyalkylene glycol refers to water-soluble polyethylene oxides, water-soluble polyethylene oxide/polypropylene oxide copolymers, and water-soluble polyethylene oxide/polybutylene oxide copolymers. Preferred water-soluble polyalkylene oxides are polyethylene glycols, particularly polyethylene glycols having a weight average molecular weight in the range of from 600 to 12,000 Daltons. An example of a suitable polyethylene glycol is PEG 8000, which is commercially available as CARBOWAX™ 8000 Polyethylene Glycol (PEG-8000, a trademark of The Dow Chemical Company ("Dow") or an affiliate of Dow, Midland, Mich.).

The diisocyanate, the polyalkylene glycol, and the capping agent of Structure Ia are contacted under reaction conditions to form the hydrophobically modified alkylene oxide urethane polymer. Preferably, the weight average molecular weight ($M_w$) of the hydrophobically modified alkylene oxide urethane polymer, as determined size exclusion chromatography (SEC) as described herein, is in the range of from 2000, more preferably from 4000 Daltons, to preferably 50,000, more preferably to 25,000 Daltons.

The compound of Structure Ia, which typically covers a range of molecular weights and compositions, can be prepared by reacting an acrylate or a methacrylate or an acrylic acid or a methacrylic acid (or optionally styrene) with a mercaptoalkanol (HO—R—SH) under radical initiated polymerization conditions. Examples of suitable acrylates and methacrylates include methyl acrylate, ethyl acrylate, n-butyl acrylate, t-butyl acrylate, 2-ethylhexyl acrylate, 2-propylheptyl acrylate, methyl methacrylate, n-butyl methacrylate, and t-butyl methacrylate.

The composition of the present invention may further comprise other additives including surfactants, coalescents, defoamers, biocides, and extenders. The composition shows surprising viscosity stability over compositions that contain colorant and HEURs that are not modified with the hydrophobic portion of Structure 1.

Molecular Weight Measurements

A. Molecular Weight Measurement of Hydroxy Terminated Acrylic Oligomers by Electrospray Ionization-Liquid Chromatography-Mass Spectrometry (ESI-LC-MS): $M_w$<1500 Daltons Samples were prepared by dissolving the hydroxyl terminated acrylic oligomers at a concentration of 5 mg/mL in THF.

Instrument: Thermo Q Exactive Orbitrap mass spectrometer interfaced with a Thermo-Dionex Ultimate 3000 liquid chromatograph system via a high voltage electrospray ionization source operating in positive ion mode.

LC Conditions:
Column: Agilent Zorbax SB C3, 150×4.6 mm, 5 μm, Temp. 45° C.
Mobile Phase: A: water/methanol (40/60 v/v) with 1 g/L ammonium acetate, and B: THF; Gradient: 20% B (2.5 min) to 45% B, then to 95% B within 10 min and hold for 10 min before coming back to the initial condition; flow rate: 0.7 mL/min. An aqueous ammonium acetate solution (1 g/L) was post added to the eluent through a tee at 0.2 mL/min.

Diode array UV detector: 210 nm-500 nm

Injection volume: 0.5 μL

ESI conditions: Spray voltage (+): 3500 V; Capillary temperature: 320° C.; Sheath gas: 60; Auxilliary gas: 20; Sweep gas: 3; probe heater temperature: 300° C.; S-Lens RF Level: 50 V MS Conditions: Full MS/dd-MS/MS Mode In-source CID: 0 eV; Default charge state: 1; Full MW resolution: 35,000; AGC target: 1e6; Maximum IT: 125 ms dd-MS/MS resolution: 17,500; maximum IT: 75 ms; Loop count: 3; MSX count: 1; TopN: 3; Isolation window: 5.0 m/z; NCE: 40 V; Stepped NCE: 50%

B. Molecular Weight Measurement of Hydroxy Terminated Acrylic Oligomers by Size Exclusion Chromatography (SEC): $M_w$>1500 Daltons and hydroxyl terminated acrylic oligomers containing styrene Samples were prepared by dissolving the hydroxyl terminated acrylic oligomers at a concentration of 1 mg/mL in THF.

SEC Conditions:

Eluent: tetrahydrofuran

Columns: 2 Polymer Labs Mixed E columns+1 Polymer Labs 100 A column, 45° C.

Flow rate: 1 mL/min

Injection volume: 100 μL

Detection: RI & UV @ 260 nm

Software: Polymer Labs Cirrus version 3.3

Calibration: 8 PMMA standards ranging from 0.625 kg/mol to 30.53 kg/mol, 3rd order polynomial fit LC: Waters e2695/Shodex RI-201/Waters 2489

C. Molecular Weight Measurement of HEUR Polymers by SEC

Samples were prepared by dissolving 1-2 mg of polymer per gram of 100 mM ammonium acetate in methanol. Samples were brought into solution by shaking overnight on a mechanical shaker at room temperature. Sample solutions were filtered using 0.45 μm PTFE filter.

Separations were carried out on a Waters Acquity APC system consisting of an isocratic pump, degasser, injector, column oven and both UV and RI detectors operated at 40° C. System control, data acquisition, and data processing were performed using version 3 of Empower software (Waters, Milford, Mass.). SEC separations were performed in 100 mM ammonium acetate in methanol (Optima grade from Fisher) at 0.5 mL/min using an APC column set composed of two Water APC columns (150×4.6 mm ID) packed with BEH Diol particles (pore size marked as BEH 200 Å and BEH 450 Å, particle size 1.7 and 2.5 μm, respectively) purchased from Waters (Milford, Mass.). 20 μL of sample were injected for APC separations.

Twelve-point calibration curve of $3^{rd}$ order obtained from narrow polyethylene oxide (PEO) standards.

EXAMPLES

Comparative Intermediate Example 1

A mixture of CARBOWAX™ 8000 Polyethylene Glycol (200 g) and toluene (325 g) was dehydrated by azeotropic distillation. The mixture was cooled to 90° C., and Des W ($H_{12}$-MDI, 11.8 g) and decanol (1.8 g) were added to the mixture followed by the addition of dibutyltin dilaurate (0.2 g) to the mixture. After stirring for 1 h at 90° C., decanol (8.27 g) was then added to the mixture. The mixture was then held at 90° C. for another 1 h with stirring. The resulting HEUR solid polymer was isolated via rotary evaporation to remove toluene. Weight average molecular weight was 23,000. For evaluation in paint, the polymer was dissolved in a mixture of water and butyl carbitol to give a final polymer solution of 25% polymer, 20% butyl carbitol, and 55% water.

Intermediate Example 1: Preparation of HEUR Capped with a Methyl Methacrylate Oligomer A. Synthesis of Hydroxy Terminated Methyl Methacrylate Oligomer A mixture of methyl methacrylate (MMA, 16.3 g, 163.2 mmol) and 2-mercaptoethanol (4.25 g, 54.4 mmol) in toluene (40 g) was degassed by bubbling $N_2$ through the mixture for 10 min, followed by heating to 90° C. To this solution was added azobisisobutyronitrile (AIBN, 0.447 g, 2.72 mmol) in toluene (25 mL) over 6 h, and the resulting solution was allowed to react at 90° C. overnight. The mixture was cooled to room temperature, diluted with toluene (100 mL) then extracted 2×50 mL with 5% aqueous $Na_2CO_3$, 2×50 mL with water and concentrated to dryness in vacuo, giving 17.9 g (87%) as a viscous, colorless oil. The resultant compound (Intermediate IA) was isolated as a mixture of compounds: $M_w$=696; $M_n$=548 as measured by ESI LC-MS.

B. Preparation of HEUR Thickener from OH-Terminated MMA Oligomer

A mixture of CARBOWAX™ PEG-8000 (PEG-8000, 40.0 g, 4.44 mmol) in toluene (250 mL) was heated to reflux, and 100 mL of the toluene was allowed to distill off. The reactor was cooled 90° C., whereupon a solution of Desmodur W $H_{12}$MDI (3.66 g, 14.0 mmol) in toluene (10 mL) was added dropwise, followed by addition of dibutyltindilaurate (1.12 mg, 1.78 mmol). Stirring was continued at 90° C. for 1 h and the reaction mixture was cooled to 80° C. Intermediate 1A (11.1 g, 20.3 mmol) in toluene (25 mL) was added and the resulting mixture was stirred at 80° C. for 2 h. The resulting polymer solution was poured into an evaporating dish and the toluene was removed under $N_2$, followed by drying in vacuo at 50° C., giving 52.6 g (96%) as a white solid. $M_w$=16,255 Daltons as measured by SEC. For evaluation in the paint, the polymer was dissolved in a mixture of water and butyl carbitol to give a final polymer solution of 10% polymer and 90% water.

Intermediate Example 2: Preparation of Preparation of HEUR Capped with a Styrene/Methyl Methacrylate Oligomer A. Synthesis of Hydroxy Terminated Methyl Methacrylate/Styrene Oligomer A degassed solution of AIBN (315 mg, 1.92 mmol), MMA (3.84 g, 38.4 mmol), styrene (12.0 g, 115.2 mmol) and 2-mercaptoethanol (3.00 g, 38.4 mmol) in toluene (25 mL) was added dropwise over 6 h to degassed toluene (35 mL) at 100° C. The mixture was stirred overnight at 100° C., then cooled to room temperature. The mixture was diluted with toluene (100 mL), then extracted 2×50 ml with 5% aqueous $Na_2CO_3$, and then 2×50 ml with water and concentrated to dryness in vacuo, giving 12.1 g as a clear oil (Intermediate 2A). $M_w$=902 Daltons and $M_n$=344 Daltons, as measured by SEC.

B. Preparation of HEUR Thickener from OH-Terminated Styrene/MMA Oligomer

A mixture of PEG-4000 (PEG 4000, 34.0 g) in toluene (200 mL) was heated to reflux, and dried by azeoptropic distillation, followed by cooling to 90° C. A solution of Des W (6.97 g) in toluene (10 mL) was added to the reaction mixture, followed by dibutyltindilaurate (0.105 g). Stirring was continued at 90° C. for 1 h, after which time the reaction mixture was cooled to 80° C. Intermediate 2A (34.88 g) in toluene (25 mL) was then added to the mixture and stirring was continued for 1 h. The resulting polymer solution was isolated and the toluene removed in vacuo to give a white solid. As measured by SEC, $M_w$=8653 Daltons and $M_n$=6837 Daltons. For evaluation in paint, the polymer was dissolved in a mixture of water and butyl carbitol to give a final polymer solution of 15% polymer, 17% butyl carbitol, and 68% water.

Example 3: Preparation of HEUR Capped with a Methyl Methacrylate Oligomer

A. Synthesis of Hydroxy Terminated Methyl Methacrylate Oligomer

A mixture of MMA (27.3 g, 273 mmol) and 2-mercaptoethanol (2.50 g, 32 mmol) in toluene (25 g) was degassed with $N_2$, then heated with stirring to 100° C. To this solution was added AIBN (0.16 g, 0.96 mmol) in toluene (20 mL) over 6 h, and stirring was continued at 100° C. overnight. The mixture was cooled to room temperature, diluted with toluene (150 mL), then extracted 2×50 ml with 5% aqueous $Na_2CO_3$, 3×50 ml with water and concentrated to dryness in vacuo, giving 28.4 g (95%) as a viscous, colorless oil. The resultant compound (Intermediate 3A) was isolated as a mixture of compounds: $M_w$=1064 Daltons; $M_n$=706 Daltons as measured by ESI LC-MS.

B. Preparation of HEUR Thickener from OH-Terminated MMA Oligomer

A mixture of PEG-8000 (32.65 g) in toluene (300 mL) was heated to reflux, and 100 mL of the toluene was allowed to distill off. The reactor was cooled 90° C., whereupon a solution of Des W (2.99 g) in toluene (10 mL) was added dropwise, followed by addition of dibutyltindilaurate (0.92 mg). Stirring was continued at 90° C. for 1 h and the reaction mixture was cooled to 80° C. Intermediate 3A (11.71 g) in toluene (25 mL) was added and the resulting mixture was stirred at 80° C. for 2 h. The resulting polymer solution was poured into an evaporating dish and the toluene was removed under $N_2$, followed by drying in vacuo at 45° C., giving 41.4 g as a white solid. As measured by SEC, $M_w$=23,200 Daltons. For evaluation in paint, the polymer was dissolved in a mixture of water and butyl carbitol to give a final polymer solution of 10% polymer and 90% water.

Example 4: Preparation of HEUR Capped with a Butyl Methacrylate Oligomer

A. Synthesis of Hydroxy Terminated Butylmethacrylate Oligomer

A solution of 2-mercaptoethanol (0.750 g, 9.60 mmol), AIBN (32 mg, 0.19 mmol) and butylmethacrylate (16.4 g, 115 mmol) in toluene (20 mL) was added to toluene (30 mL) with stirring at 95° C. over 6 h, and stirring was continued overnight. The reaction mixture was cooled to room temperature and diluted with toluene (100 mL) and the organic layer was washed with 2×50 mL of 5 wt % $Na_2CO_3$, then washed with 3×50 mL of water and concentrated to dryness, giving 13.64 g (88%) as a clear, viscous oil. The resultant compound (Intermediate 4A) was isolated as a mixture of compounds: As measured by ESI LC/MS, $M_w$=1387 Daltons and $M_n$=903 Daltons.

B. Preparation of HEUR Thickener from OH-Terminated MMA Oligomer

A mixture of PEG-8000 (53.8 g) in toluene (400 mL) was heated to reflux, and 150 mL of the toluene was allowed to distill off. The reactor was cooled 90° C., whereupon a solution of HDI (1.53 g) in toluene (5 mL) was added dropwise, followed by addition of dibutyltindilaurate (1.56 mg). Stirring was continued at 90° C. for 1 h and the reaction mixture was cooled to 80° C. Intermediate 4A (5.81 g) in toluene (20 mL) was added and the resulting mixture was stirred at 80° C. for 2 h. The resulting polymer solution was poured into an evaporating dish and the toluene was removed under $N_2$, followed by drying in vacuo at 45° C., giving 58.1 g as a white solid. As measured by SEC, $M_w$=41,313 Daltons and $M_n$=26,192. For evaluation in paint, the polymer was dissolved in a mixture of water and butyl carbitol to give a final polymer solution of 10% polymer and 90% water.

Paint Formulation

Table 1 is a recipe for the unthickened tint base paint formulation, that is, the paint without colorant and HEUR rheology modifier. TERGITOL, TAMOL, and RHOPLEX are all Trademarks of The Dow Chemical Company or Its Affiliates.

TABLE 1

Unthickened Tint Base Paint Formulation

| Material Name | Pounds | Gallons |
| --- | --- | --- |
| Grind | | |
| Water | 50 | 6.0 |
| Dow Corning ® 8590 Defoamer | 1 | 0.1 |
| TERGITOL ™ 15-S-9 Surfactant | 4 | 0.5 |
| TAMOL ™ 2011 Dispersant | 1.8 | 0.2 |
| AMP-95 Neutralizer | 1 | 0.1 |
| Minex 7 Extender | 25 | 1.2 |
| Ti-Pure R-706 $TiO_2$ | 25 | 0.8 |
| Water | 34.1 | 4.1 |
| Letdown | | |
| RHOPLEX ™ HG-706 Emulsion | 595.8 | 67.1 |
| Texanol Ester Alcohol | 6.7 | 0.8 |
| Optifilm 400 Film Enhancer | 2.7 | 0.3 |
| DC-8590 Defoamer | 1 | 0.1 |
| Water | 156.1 | 18.7 |

Table 2 illustrates the ΔKU viscosity changes observed when the colorant is added at levels of 12 oz of colorant per 116 oz of tint base paint and thickener. ΔKU Black and ΔKU Blue refer, respectively, to the changes in KU viscosity observed in the paint upon addition of Colortrend Lamp Black and Colortrend Phthalo Blue 808 Colorants.

TABLE 2

KU Viscosity Data for Deep Base Paint Formulation with HEURs

| | Paint Formulation | | | | |
| --- | --- | --- | --- | --- | --- |
| | Control | 1 | 2 | 3 | 4 |
| | | Intermediate Example | | | |
| | Comp. 1 | 1 | 2 | 3 | 4 |
| HEUR amt. | 2.7 | 4.5 | 4.3 | 2.1 | 3.1 |
| ΔKU Black | −35.8 | −2.9 | 13 | −8.3 | −26 |
| ΔKU Blue | −30.5 | −2.4 | 14 | −5.2 | −19.8 |

The data show that HEURS capped with the capping agent of Structure Ia gives significantly improved viscosity stability over a conventional alkyl based capping agent (n-decanol) upon addition of colorant. This advantageous trend has been generally observed over conventional $C_{10}$-$C_{20}$ alkyl based capping agents.

The invention claimed is:

1. A composition comprising an aqueous dispersion of a) 10 to 60 weight percent, based on the weight of the composition, of polymer particles; b) less than 15 pigment volume concentration (PVC) of pigment particles; and c) from 0.05 to 2 weight percent, based on the weight of the composition, of a hydrophobically modified poly(oxyalkylene-urethane) rheology modifier having a hydrophobic portion represented by Structure I:

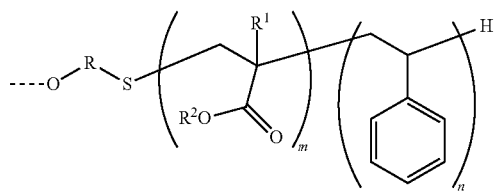

where R is a $C_2$-$C_{20}$ divalent hydrocarbyl group; each $R^1$ is independently H or methyl; each $R^2$ is independently H, $C_1$-$C_{18}$-alkyl, $C_5$-$C_8$-cycloalkyl, aryl, $C_1$-$C_{18}$-alkylaryl, $C_1$-$C_3$-dialkylamino-$C_1$-$C_{18}$-alkyl, $C_1$-$C_{30}$-alkoxy-$(CH_2CH_2O)_z$—$CH_2CH_2$—, aryloxy-$(CH_2CH_2O)_z$-$CH_2CH_2$— or glycidyl; m is 2 to 20; n is 0 to 20; m+n is 2 to 20; and z is from 0 to 50.

2. The composition of claim 1 wherein R is a $C_2$-$C_{10}$ branched or linear alkylene group; each $R^2$ is independently a $C_1$-$C_{18}$ alkyl group; m is 3 to 10; n is 0 to 5; and m+n is 3 to 10.

3. The composition of claim 2 which comprises less than 10 PVC of pigment particles.

4. The composition of claim 3 wherein m is 3 to 8; n is 0; R is a —$CH_2CH_2$— group, a —$CH_2CH_2CH_2$— group, or a —$CH_2CH_2CH_2CH_2$— group; each $R^2$ is independently methyl, ethyl, propyl, n-butyl, 2-ethylhexyl, or 2-propylheptyl.

5. The composition of claim 4 wherein the hydrophobically modified poly(oxyalkylene-urethane) rheology modifier is a polyethylene oxide urethane polymer having a $M_w$ in the range of from 2,000 to 50,000 Daltons as determined by size exclusion chromatography.

6. The composition of claim 5 wherein R is a —$CH_2CH_2$— group; $R^1$ and $R^2$ are each methyl.

7. The composition of claim 2 wherein the polymer particles comprise, based on the weight of the polymer particles at least 50 weight percent structural units of acrylate and methacrylate monomers and from 0.2 to 5 weight percent of an ethylenically unsaturated carboxylic acid monomer.

8. The composition of claim 2 wherein the polymer particles comprise, based on the weight of the polymer particles at least 50 weight percent structural units of a vinyl ester monomer.

9. The composition of claim 1 which further comprises from a colorant at a concentration in the range of from 5 to 20 volume percent of the total volume of the composition and colorant.

* * * * *